(12) United States Patent
Secunda et al.

(10) Patent No.: US 12,192,201 B2
(45) Date of Patent: Jan. 7, 2025

(54) MULTI-PARTY DOCUMENT VALIDATION

(71) Applicant: Workbright, Boulder, CO (US)

(72) Inventors: David Abraham Secunda, Boulder, CO (US); Patrick Ryan Navarro, Longmont, CO (US); Brian Eisemann, Dillon, CO (US)

(73) Assignee: Workbright, Boulder, CO (US)

( * ) Notice: Subject to any disclaimer, the term of this patent is extended or adjusted under 35 U.S.C. 154(b) by 77 days.

(21) Appl. No.: 17/066,866

(22) Filed: Oct. 9, 2020

(65) Prior Publication Data

US 2021/0112057 A1 Apr. 15, 2021

Related U.S. Application Data

(60) Provisional application No. 62/914,917, filed on Oct. 14, 2019.

(51) Int. Cl.
*G06F 16/93* (2019.01)
*G06F 21/64* (2013.01)
*G06Q 10/10* (2023.01)
*H04L 9/40* (2022.01)

(52) U.S. Cl.
CPC .......... *H04L 63/0876* (2013.01); *G06F 16/93* (2019.01); *G06F 21/64* (2013.01); *H04L 63/107* (2013.01); *G06Q 10/103* (2013.01)

(58) Field of Classification Search
CPC ... H04L 63/0876; H04L 63/107; G06F 16/93; G06F 21/64; G06F 2221/2111; G06Q 10/103; H04W 12/108; H04W 12/63; H04W 12/104

See application file for complete search history.

(56) References Cited

U.S. PATENT DOCUMENTS

| | | | | |
|---|---|---|---|---|
| 10,122,535 B2* | 11/2018 | Raduchel | ............ | G06F 21/6272 |
| 10,687,301 B1 | 6/2020 | Demsey | | |
| 10,693,872 B1* | 6/2020 | Larson | .................. | H04L 9/3231 |
| 10,726,373 B1* | 7/2020 | Unger | ................ | G06Q 10/0633 |
| 10,747,971 B2* | 8/2020 | Hagen | ................... | G06Q 50/00 |
| 2002/0143704 A1 | 10/2002 | Nassiri | | |

(Continued)

FOREIGN PATENT DOCUMENTS

CN 104333530 2/2015

*Primary Examiner* — Wasika Nipa
*Assistant Examiner* — Andrew Suh

(57) ABSTRACT

The disclosed technology provides solutions for performing a document validation process wherein physically present witnesses are required. In some aspects, a process of the disclosed technology includes steps for receiving geolocation data for a mobile device associated with a first user, receiving a signed electronic document via the first device, determining if the signed electronic document was properly executed by the first user, and if the signed electronic document was properly executed, providing a prompt to the first user, wherein the prompt is configured to request electronic contact address for a second device associated with a second user. In some aspects, the process can further include transmitting an authentication request to the second device associated with the second user, receiving geolocation data from the second device in response to the authentication request. Systems and machine-readable media are also provided.

9 Claims, 12 Drawing Sheets

(56) References Cited

U.S. PATENT DOCUMENTS

| | | | | |
|---|---|---|---|---|
| 2006/0047963 A1* | 3/2006 | Brown | ............... | H04L 9/3247 |
| | | | | 713/176 |
| 2012/0284602 A1* | 11/2012 | Seed | ............... | G06Q 20/3274 |
| | | | | 715/224 |
| 2013/0219284 A1* | 8/2013 | Kim | ............... | H04L 51/046 |
| | | | | 707/754 |
| 2013/0219504 A1* | 8/2013 | Mosier | ............... | G06F 21/1063 |
| | | | | 726/26 |
| 2015/0150141 A1* | 5/2015 | Szymanski | ............... | G06F 21/64 |
| | | | | 726/26 |
| 2015/0213568 A1* | 7/2015 | Follis | ............... | G06Q 50/18 |
| | | | | 705/311 |
| 2016/0048696 A1 | 2/2016 | Follis | | |
| 2017/0286415 A1* | 10/2017 | Kumar | ............... | G06F 16/93 |
| 2018/0158104 A1* | 6/2018 | Malloy | ............... | H04L 67/52 |
| 2018/0239959 A1* | 8/2018 | Bui | ............... | G06Q 10/103 |
| 2019/0005145 A1* | 1/2019 | Kleinberg | ............... | G06F 16/93 |
| 2019/0036707 A1* | 1/2019 | Eliezer | ............... | H04L 63/0861 |
| 2019/0097804 A1* | 3/2019 | Parikh | ............... | H04L 9/0872 |
| 2019/0311448 A1 | 10/2019 | Kaminski et al. | | |
| 2019/0320039 A1* | 10/2019 | Kamal | ............... | H04L 63/0861 |
| 2019/0354706 A1* | 11/2019 | Bartlett | ............... | G06F 40/171 |
| 2020/0019715 A1* | 1/2020 | Malliah | ............... | G06F 16/176 |
| 2020/0380627 A1* | 12/2020 | Jarvis | ............... | G06Q 50/265 |

* cited by examiner

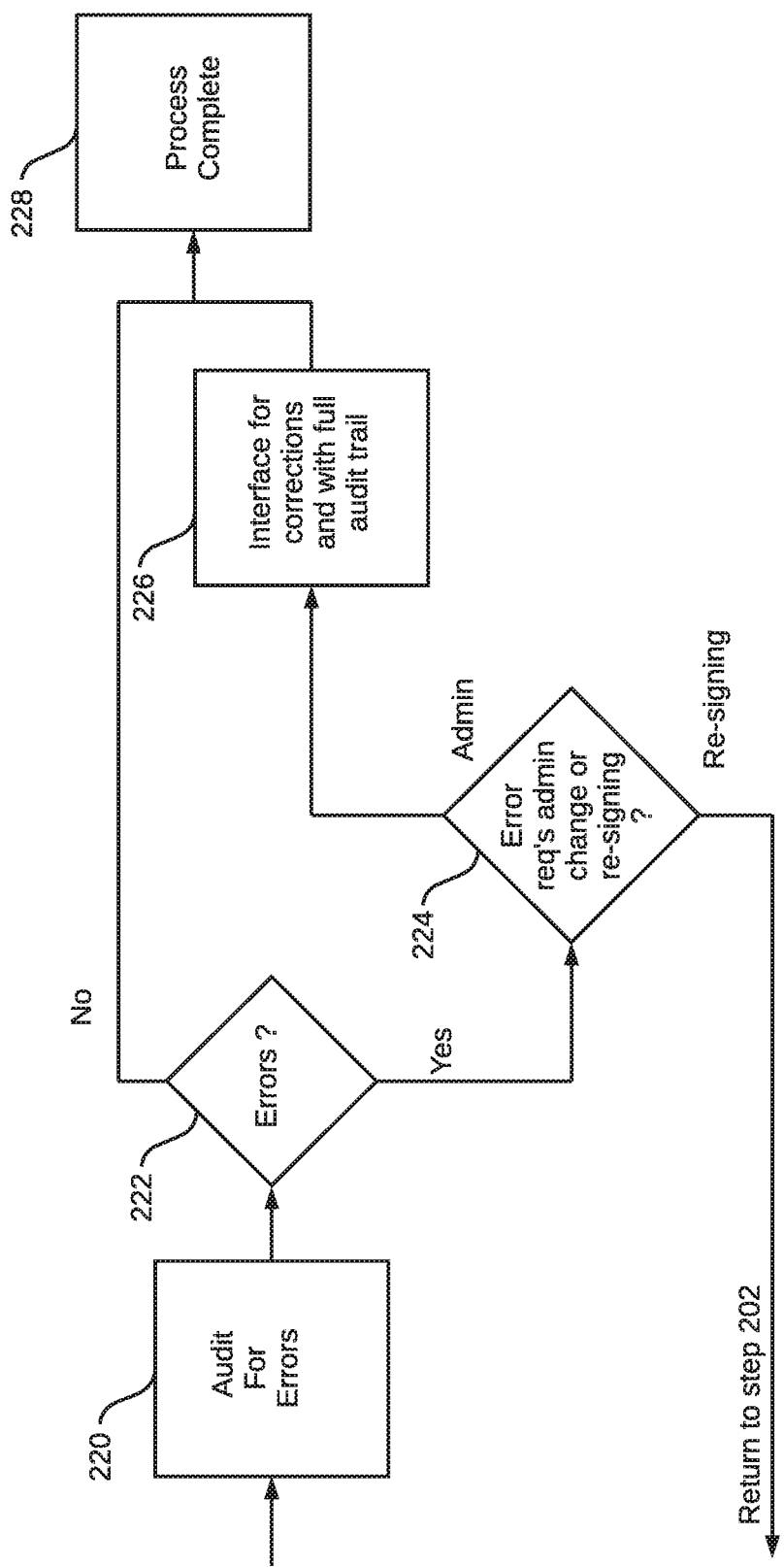

302 — Create a new password

Welcome! Please take a moment to change your password.

- New password
- Confirm password

☐ I agree to the Privacy Policy and End User License Agreement

[Save]

304 — Upload your Documentation

U.S. Passport
- Document Front

[Passport image]
- Remove

308

- Document Title
- Issuing Authority
- Document Number

Enter the document number as it appears on the document.

- Expiration Date

The document must be UNEXPIRED. Enter N/A if the documents does not have an expiration date.

306

Upload a photo of the inside page of your passport (with your picture visible), not the front cover.

[Previous]   65% complete   [NEXT]

FIG. 3

Please confirm the following documents match the provided hard copies provided to you:

Passport [ ]  [Match] [No Match]

432

[CONTINUE]

Great! All documents are matched. Please certify you examined the documents:

First Name [ ]
Last Name [ ]

Signature [ ]

434

[SUBMIT]

Please click FINISH and hand the device back to <first name>

Thank you.

[Finish]

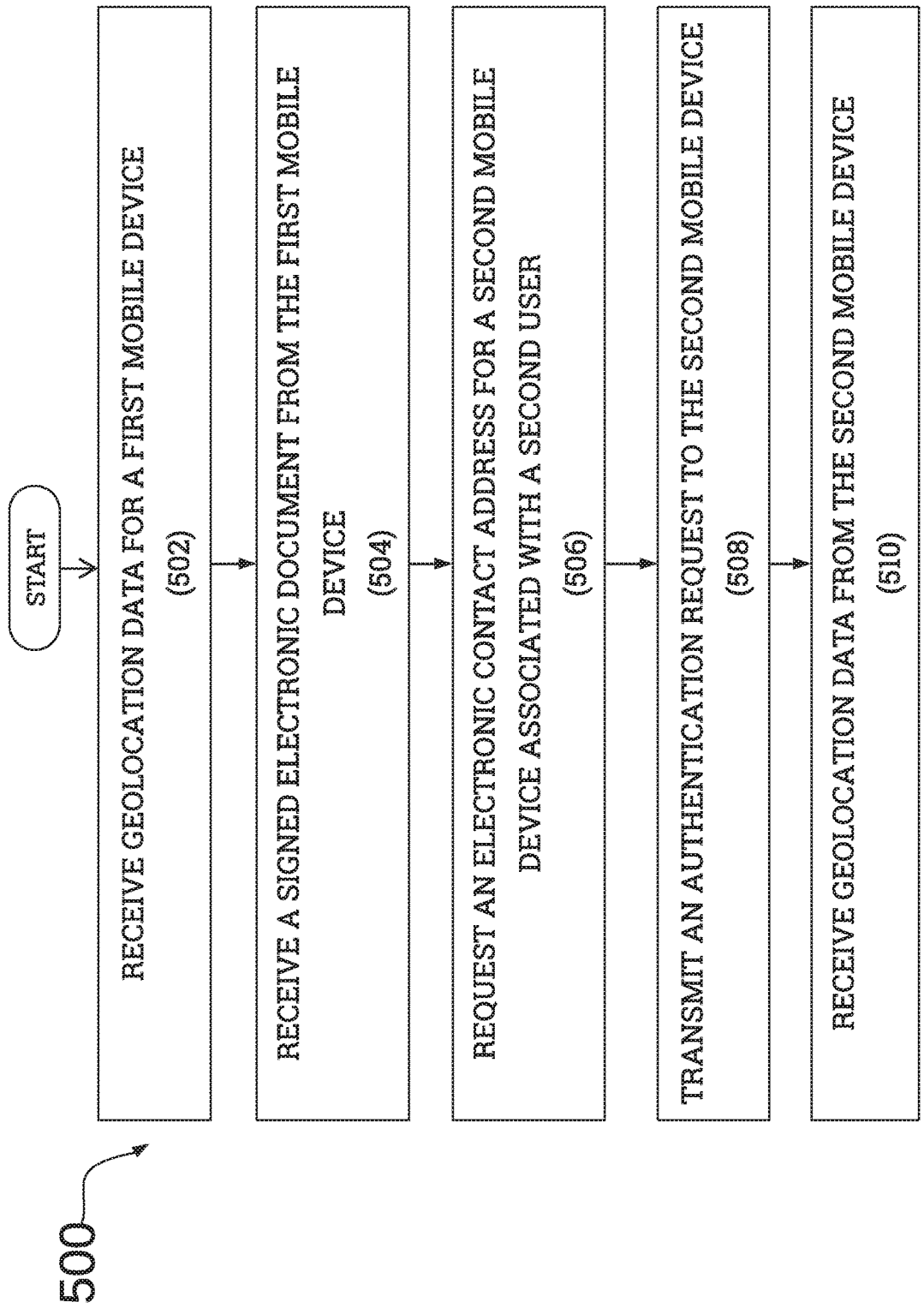

MULTI-PARTY DOCUMENT VALIDATION

CROSS-REFERENCE TO RELATED APPLICATIONS

This application claims the benefit of U.S. Application No. 62/914,917, filed Oct. 14, 2019, entitled "MULTI-PARTY VALIDATION USING MOBILE DEVICE", which is incorporated by reference in its entirety.

BACKGROUND

1. Technical Field

The subject technology generally relates to methods for validating a document authentication process and in particular, for validating live (in-person) multi-party participation in a document authentication workflow.

2. Introduction

Conventional new employee onboarding processes can be cumbersome, requiring live (in-person) authentication of various forms and identification documents by a third-party witness. Due to the high likelihood of document errors, such as typos and incorrect document production, conventional validation processes must often be repeated before completion. Such processes are particularly onerous for remote workers such as those participating in "gig" economy jobs, for example, that do not have ready access to live HR personnel to assist them with the onboarding process.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIGS. 2A-2C illustrate block diagrams of an example multi-party document validation process, according to some aspects of the disclosed technology.

FIG. 3 illustrates examples of user displays that can be generated to facilitate the user (signer) account creation and document upload process, according to some aspects of the disclosed technology.

FIGS. 4A-4E illustrate example displays that can be provided to a signer and/or a validator to facilitate a document validation process, according to some aspects of the disclosed technology.

FIG. 5 illustrates steps of an example process for implementing a multi-party document validation method, according to some aspects of the disclosed technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology address the limitations of conventional onboarding workflows by providing systems and methods for facilitating remote document collection and third-party validation. In some aspects, the disclosed technology includes systems and software, including mobile device applications, that provide instructions to a user (i.e. a new worker), to facilitate the onboarding process.

In some implementations, a document validation process is performed whereby a physical presence of a third-party document validator (also in-person validator, or third-party validator) is confirmed, e.g., using a document validation platform and associated processes (software). As discussed in further detail below, the document validation platform can be configured to collect location information about the document signer, as well as a third-party validator, to confirm that the third-party validator is in-fact physically present for the document signing, and able to review documents associated with the signer.

Figure 1:
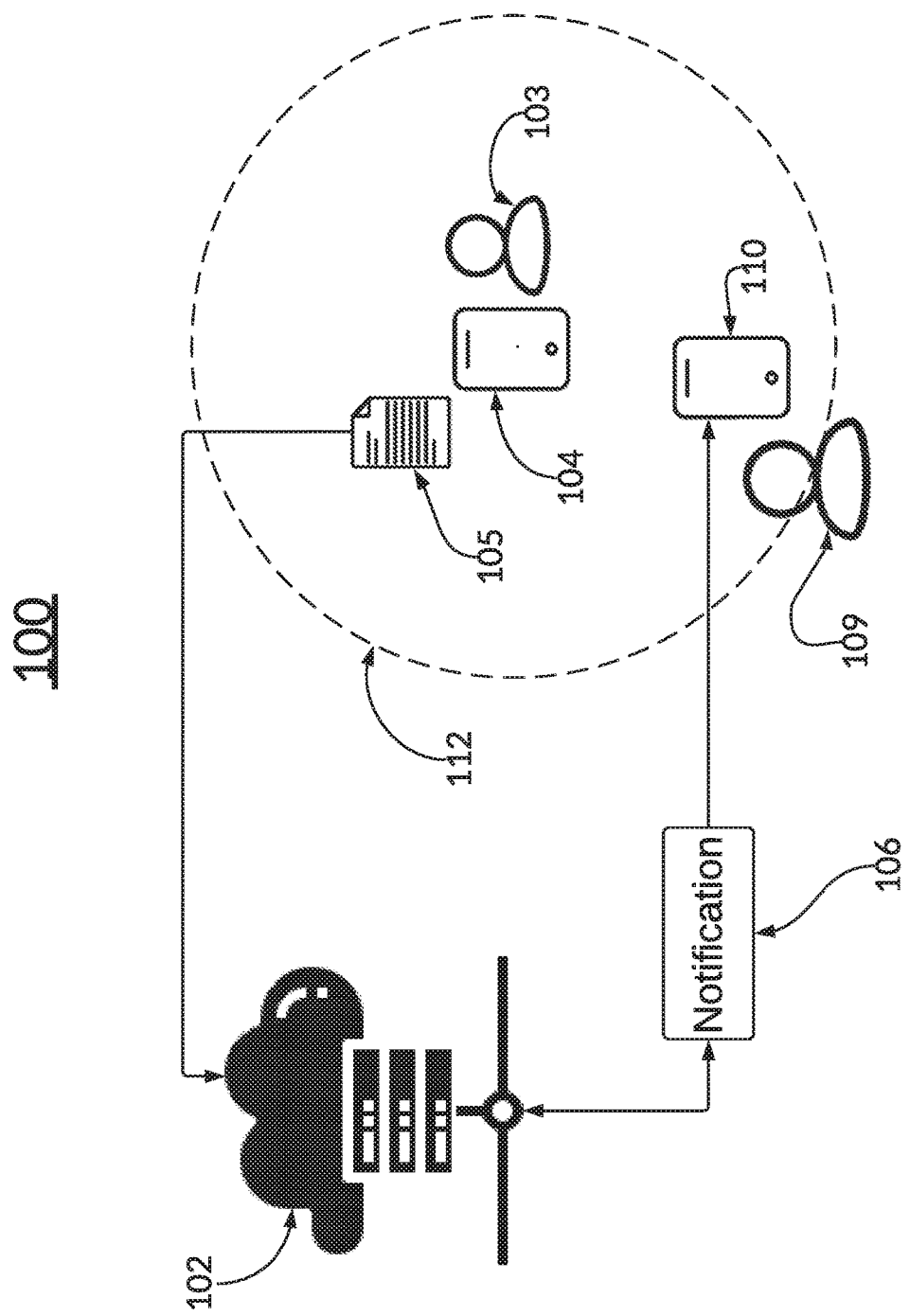
FIG. 1 illustrates an example of a network environment in which a document validation platform may be implemented, according to some aspects of the disclosed technology.

FIG. 1 illustrates an example of a network environment 100 in which a document validation platform 102 may implemented. It is understood that validation platform 102 can include one or more computing devices (e.g., servers) including software and/or firmware necessary to implement a validation process, as discussed herein. Document validation platform 102 may include one or more compute nodes operating in a distributed computing environment, such as a cloud computing environment. Additionally, validation platform may include one or more software modules, or applications (e.g., mobile apps) that are executed on one or more remote computing devices (e.g., 104, 110), such as edge computing devices or mobile devices, including but not limited to: smart phones, tablet computers, personal computers (PCs), or notebook computers, and the like. For example, routines or applications used to facilitate a document validation process may be executed on one or more mobile devices, such as mobile devices 104 and/or 110, as illustrated in environment 100, as discussed in further detail below.

Validation platform 102 is configured to communicate with various remote mobile devices, for example, to receive documents, and perform an in-person document verification process. Communication with mobile devices (104, 110) can occur over a variety of communication networks, including, but not limited to: telephone networks, cellular networks, and/or a network of computer networks, e.g., the Internet.

In practice, validation platform 102 is configured to receive personal data, one or more signed documents 105, and one or more authorization documents 105 from a first user 103 (e.g., a signer), verify the documents 105, and validate the physical presence of the documents 105 using a third-party witness or validator 109 (e.g., "Authorized Representative"). In some implementations, the signer's personal data (e.g., name, address, date of birth, place of birth, country of citizenship, etc.) can be transmitted to platform 102 by the signer (e.g., signer 103) using mobile device 104. Additionally, photographs or scans of one or more authorization documents 105 (e.g., driver's license, passport, social security card, and/or birth certificate), can be uploaded to validation platform 102, using mobile device 104. Finally, any signed documents 105, such as, employment authorization forms (e.g., Form I-9), employment tax forms, identification cards, and/or other signed documentation can also be scanned, or digitally signed by signer 103, using mobile device 104.

Once all items (e.g., personal data, authorization documents, and signed documents, etc.), have been received at validation platform 102, the validation platform can perform processing to verify that the submitted information is complete and correct. For example, validation platform 102 can analyze uploaded documents 105 to ensure that all necessary information has been provided, that the signer's personal data can be corroborated and that it matches any information provided in the signed documents 105. Such processes can involve an optical character recognition analysis of one or more documents 105, e.g., to extract text to perform any necessary comparisons/analysis.

Validation platform 102 is also configured to validate the physical presence of third-party validator 109, for example, that can act as a witness to verify that the signer's authorization documents 105 are physically present during the document execution process. Validation platform 102 can verify a physical presence of third-party validator 109 in different ways, depending on the desired implementation. In some aspects, validation platform can send a notification 106 to third-party validator 109, to request access to location information of an associated device 110. In some implementations, notification 106 may be a message sent using a Short Messaging Service (SMS), however, other notification types are contemplated. For example, notification 106 may be a push notification that is sent to a mobile application or browser application executed on device 110.

Notification 106 can include a request to report location information for the receiving device (e.g., mobile device 110), as well as provide a link and/or other instructions for sending the location information. Once received by validation platform 102, location information of mobile device 110 associated with third-party validator 109 can be used to determine if the location of mobile device 110 is within a predetermined threshold 112 of mobile device 104, indicating that the third-party validator 109 and signer 103 are proximately located to one another. By way of example, the predetermined threshold 112 may be 2 meters, 5 meters, or 15 meters. However, other thresholds may be used without departing from the scope of the disclosed technology. In some instances, location information used to localize the mobile devices (103, 110) may be determined using one or more Global Navigation Satellite System (GNSS) systems, which can include, but are not limited to, the US-based Global Positioning System (GPS), the Russia-based Global Navigation Satellite System (GLONASS), the China-based BeiDou Navigation Satellite System (BDS), and/or the Europe-based Galileo GNSS. In some aspects, localization of mobile devices (103, 110) can be based on Internet Protocol (IP), address information, or other network address information that can be used to infer physical device location.

In some aspects, validation platform 102 can be configured to perform a document validation process without the collection of location information. For example, in such aspects, a photograph of the signer and third-party validator may be uploaded to validation platform 102. In other aspects, a code (e.g., a QR code or barcode) displayed on a device associated with the third-party validator (e.g., mobile device 110), may be scanned by mobile-device 104, associated with the signer, to verify that both parties are in the same physical location. Further details regarding steps to perform physical document verification are provided below.

Figure 2A:
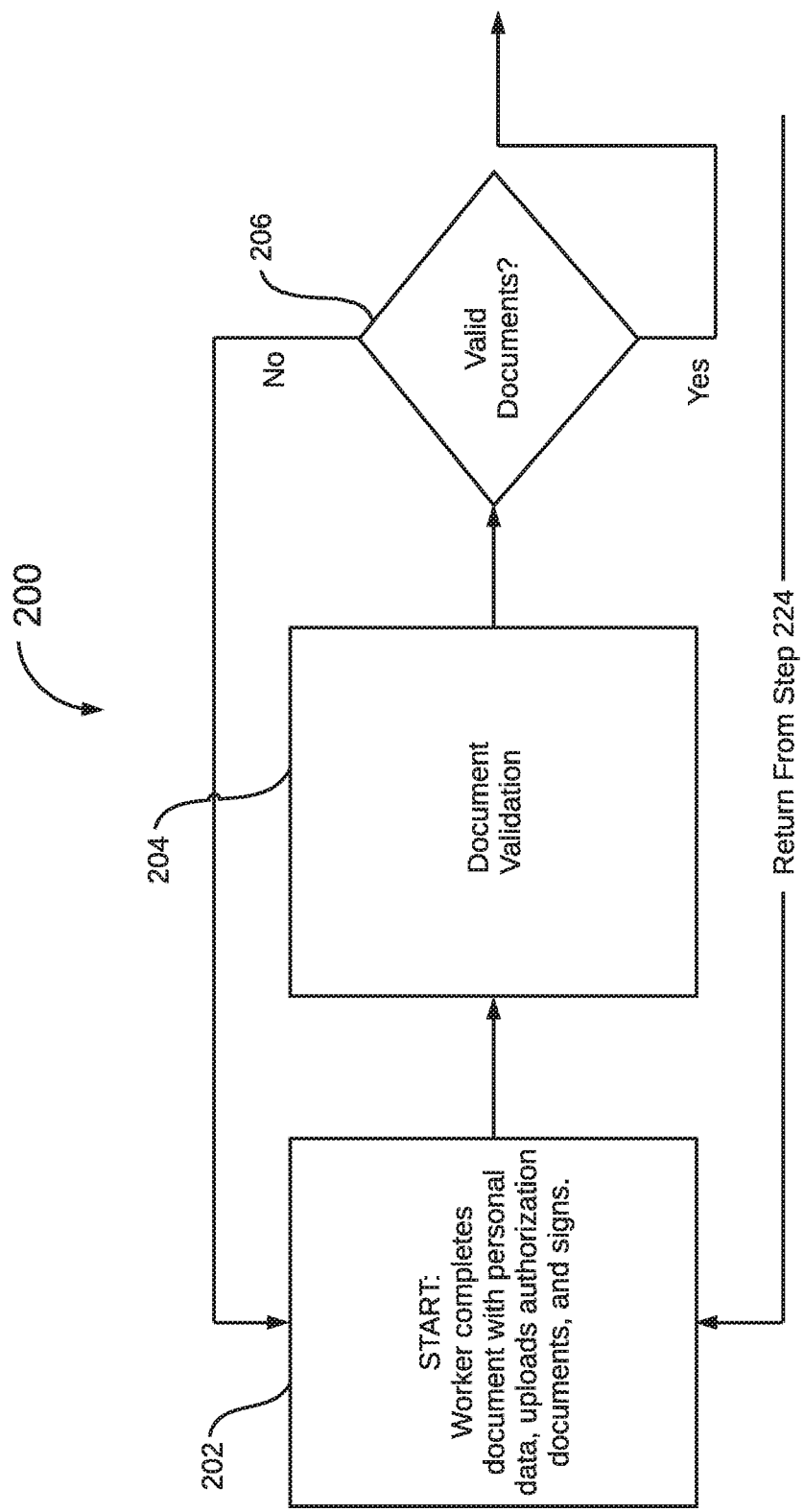
Figure 2B:
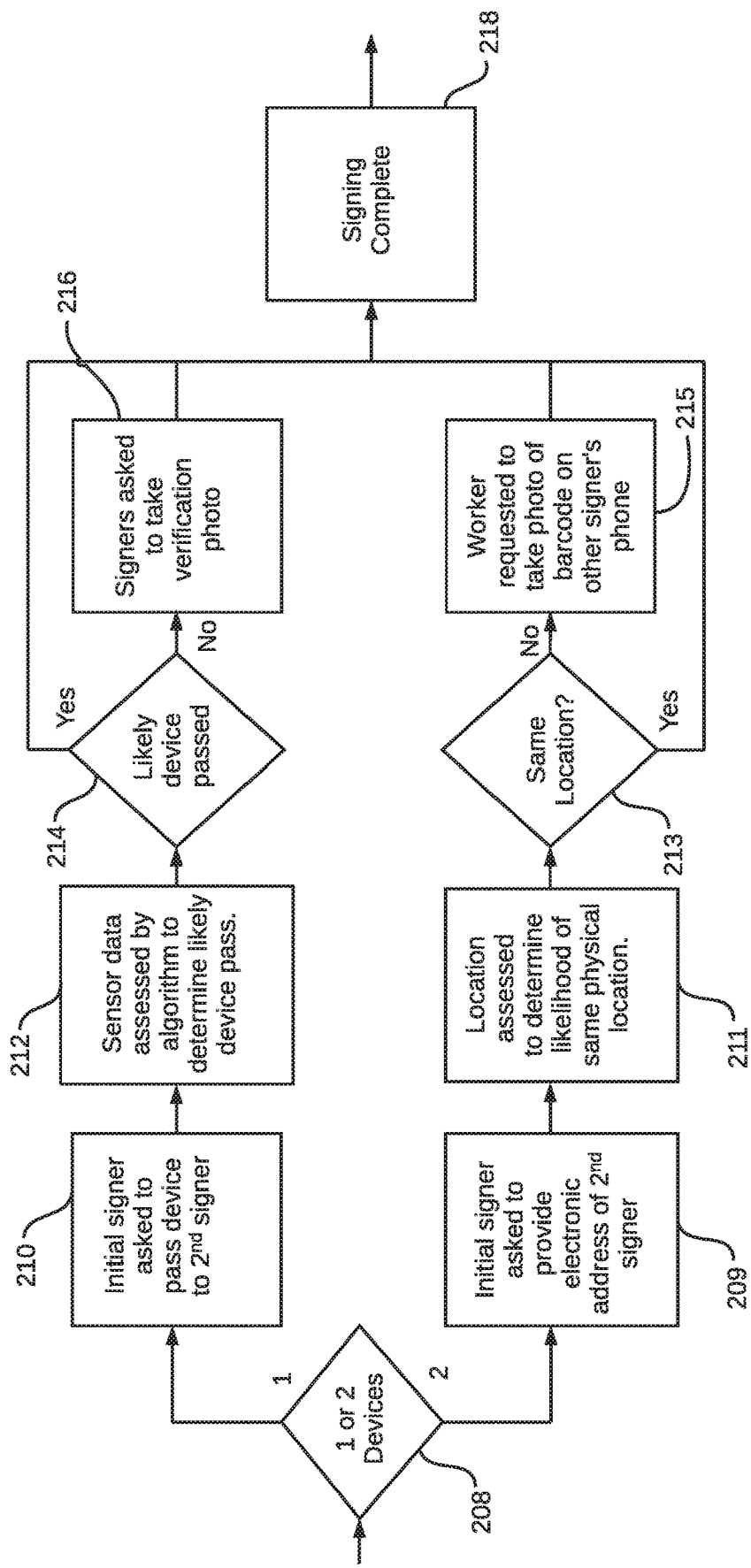

FIGS. 2A-2C illustrate block diagrams of an example multi-party document validation flow process 200. Process 200 begins with step 202 in which a signer (worker or first user) completes a required employment form (e.g., an employment Form I-9) with personal data and uploads one or more authorization documents. As discussed above, authorization documents can include any documents that can be used to confirm the signer's identity, citizenship status, and/or tax status, etc. As such, authorization documents can include government issued identifications, such as a driver's license, birth certificate, or passport. In some aspects, personal data can be entered digitally by the signer, for example, the mobile/client device, for example, using a digitized version of the required document/s (e.g., Form I-9). Alternatively, personal data can be provided on a hard-copy of a document, and a scanned version may be uploaded using the mobile-device, or other document scanning hardware. Although the examples provided herein relate to certain document types, it is understood that the described processes are not limited to any the authentication/validation of any particular document type, and that similar implementations may be deployed for the authentication of various other documents and in different workflow scenarios, without departing from the scope of the disclosed technology.

At step 204, the authorization documents are analyzed for validity, for example, by a validation platform 102, as discussed above. Depending on the desired implementation, document validation may be performed by a human and/or a machine operator. In either instance, validation can be performed to ensure that the correct documents have been provided by the signer/worker and to ensure that one or more information fields are devoid of mistakes, such as typographic errors. Subsequently, at step 206, it is determined whether the documents were properly validated at step 204. If the documents were not properly validated, process 200 proceeds back to step 202. Alternatively, if the documents were properly validated, then process 200 proceeds to step 208.

Referring to FIG. 2B, at step 208, the signer is given an option to indicate a number of devices (e.g. mobile devices) to be used to perform document validation. If at step 208, a single device is selected, process 200 proceeds to step 210 in which the signer is asked to pass the mobile device to the physically present second signer (e.g., second user or third-party validator). Next, at step 212 sensor data e.g., (accelerometer and/or gravity sensor data) is collected and processed to determine if the mobile device has in-fact been passed to the second signer. The collection of accelerometer and/or gravity sensor data for this purpose is used to ensure that a second physically present (live) person/validator is present with the first signer, and is available to validate the onboarding documents. At step 214, a determination is made regarding the likelihood that the mobile device has been passed to the second party/signer. If it is determined that the device was not likely passed to a second signer, then process 200 advances to step 216, and the user is prompted to take a photograph of all present parties, for example, to provide extra validation/evidence that the two parties are physically present in the same location, e.g., for the purpose of validating physical authorization documents. Alternatively, if it is determined that the mobile device (e.g. smartphone) was likely passed to the second signer, then process 200 advances to step 218 and the document signing process is completed.

Alternatively, if at step 208, a two-device selection is made, then process 200 proceeds to step 209 in which the initial signer (user/worker) is prompted to enter an electronic address (e.g., cell phone number) of the second party. At step 211, location and IP address data of both devices are assessed to determine if the mobile device location associated with the user is the same/proximate to the mobile device location of the second signing party. Next, at step 213, it is determined, based on the mobile device location data, whether the user and the second signer are in the same location; if both signers are not in the same location, then process 200 advances to step 215, and the first signer is prompted to take a picture of a validation code, e.g., a barcode or Quick Response (QR) code displayed on the second signer's mobile device. Alternatively, if both signers are determined to be in the same location, process 200 advances to step 218 and the document signing process is completed. In some aspects, an error audit is subsequently performed.

Referring to FIG. 2C, starting at step 220 in which an error audit is performed on the signed documents. The audit can be performed by a human reviewer and/or by an automated (machine) auditing process. At step 222, if one or more errors in the signed documents are detected, then process 200 advances to step 224, in which it is determined whether the errors require re-signing by the signatory parties. If re-signing is required at step 224, then process 200 loops back to step 202, and process 200 re-starts.

Alternatively, if at step 224 it is determined that the detected errors do not require re-signing/validation of the documents, then process 200 advances to step 226, and in-document corrections are made, for example, via a provided Graphical User Interface (GUI) that facilitates editing/correction to one or more of the onboarding documents. Process 200 completes at step 228 once errors have been corrected at step 226 or alternatively, if no errors are detected at step 222, discussed above.

FIG. 3 illustrates examples of user displays, e.g., Graphical User Interfaces (GUIs), that can be generated to facilitate signer (first user) account creation and document upload process. For example, display 302 shows an example GUI that can be provided to signer to facilitate the creation of an account, for example, on a document validation platform of the disclosed technology. Once the signer account has been created, a GUI (e.g., display 304) may be provided to facilitate the uploading of authentication documents to the document validation platform. In the example of FIG. 3, the signer's authentication documents include a passport document that is displayed in window 306, whereas corresponding personal data can be entered into fields provided in a separate window 308.

FIGS. 4A-4E illustrate example displays that can be provided to a signer (first user) and/or a validator/authorized representative (second user) to facilitate a document validation process. At display screen 402, a selection is made by the user/signer/worker to use his/her mobile device to complete the document validation process. At screen 404, the user is prompted to give his/her mobile device to the second signer. Between screen 404, and screen 406 a validation algorithm can be implemented to determine if the mobile device was handed from one party to another, as discussed above. Screen 406 provides guidance to the second signer, e.g., confirm that indicated onboarding documents are physically present. Screen 408 provides an example how the second signer can be prompted to authenticate the required documents, for example, by matching the physically present copy to a digital version of one or more documents previously furnished by the user. Screens 410 and 412 provide signatory screens and a completion confirmation, respectively.

Figure 4A:
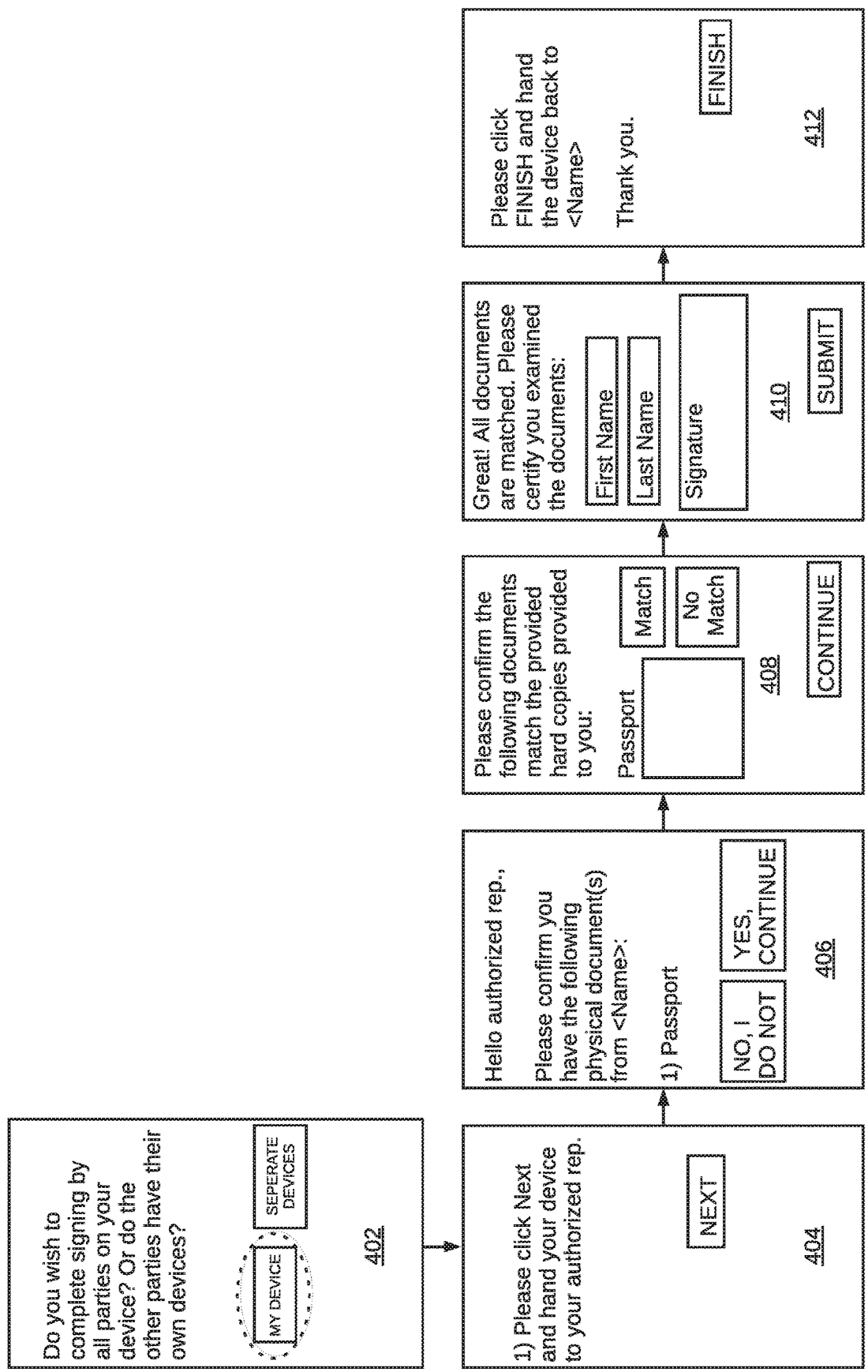
Figure 4B:
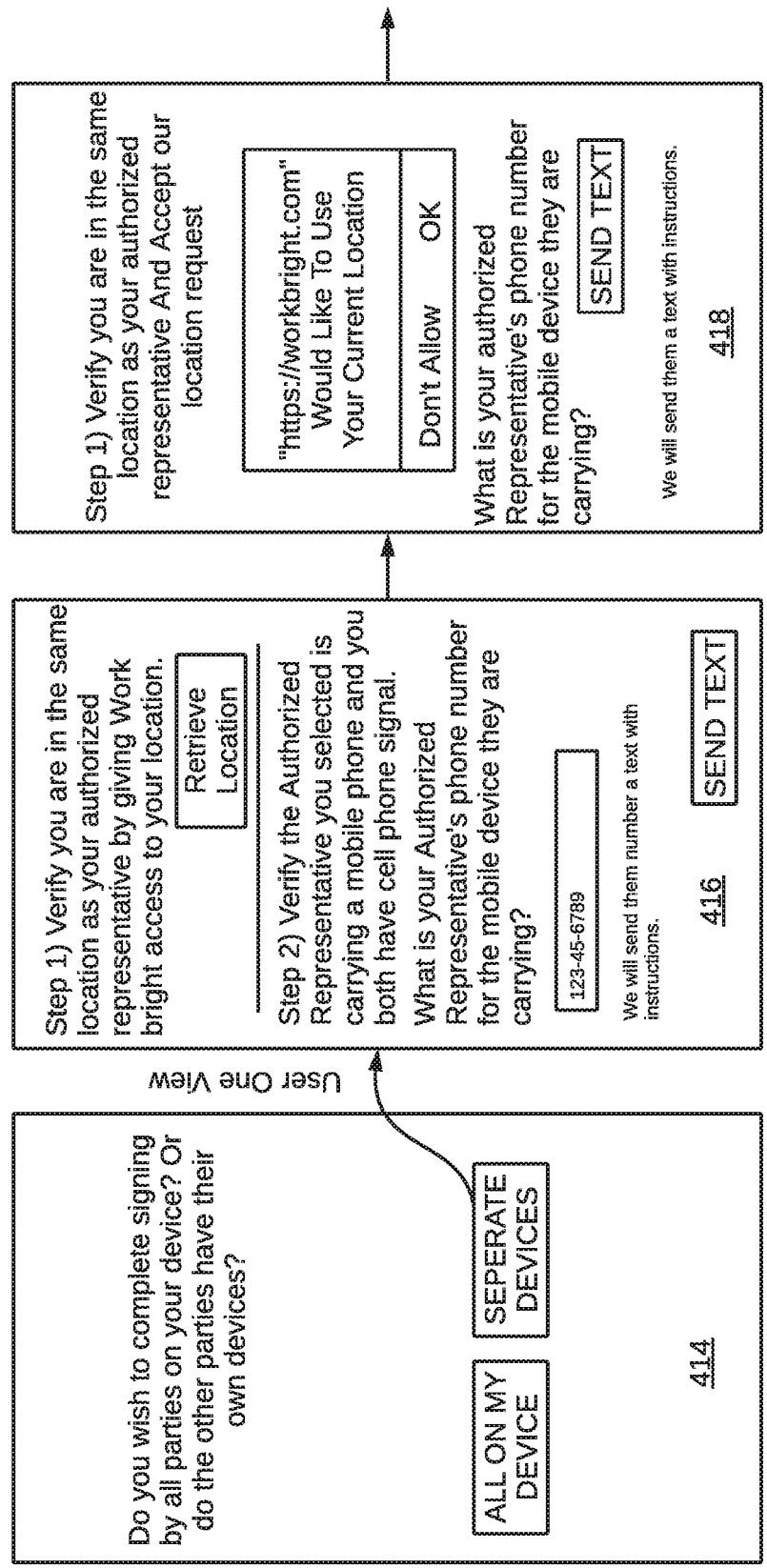
Figure 4C:
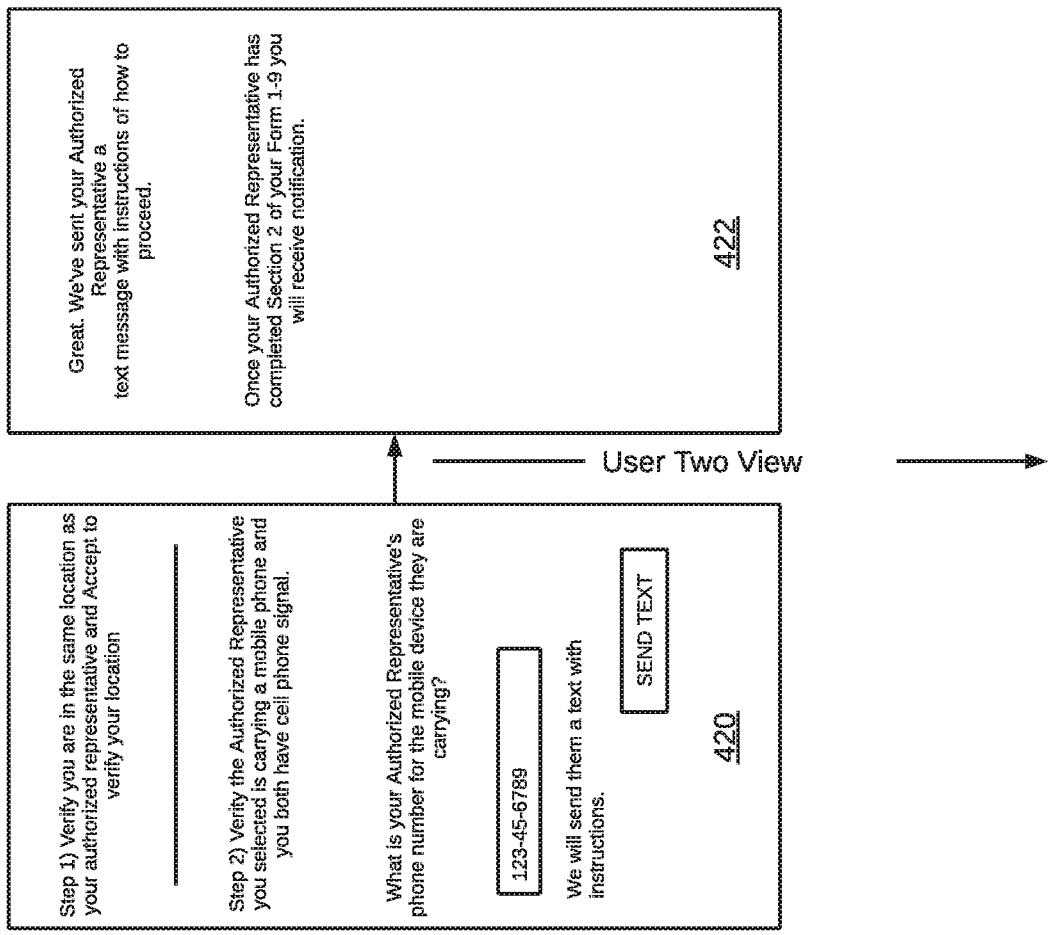

FIG. 4B illustrates example display screens (414-418) provided to a device associated with the third-party validator second signer (i.e., Authorized Representative), wherein separate devices are used. Screen 414 provides the signer option to use multiple devices. Subsequently, screen 416 provides a request to the signer (e.g., a text or SMS message) to retrieve the location information of his/her associated device. Retrieval of geolocation information from the device can be performed using a geolocation API, which retrieves geolocation information for one or more network infrastructure entities (e.g., cell towers or internet relays) connected to the device. In some aspects, geolocation information by be retrieved directly from a GPS receiver on the device. At display 418, a confirmation is provided that the validation platform is to receive location information for the mobile device. At display 420, an input field is provided, for example, that allows the signer to provide the third-party validator's mobile telephone number, or other electronic address. Confirmation, at display 422, is then provided to the signer, via the associated mobile device, that a message has been sent to the third-party validator/authorized representative. The process then proceeds on GUIs provided on a device associated with the third-party validator/authorized representative (e.g., a second mobile device, such as mobile device 110, discussed above with respect to FIG. 1.

Figure 4D:
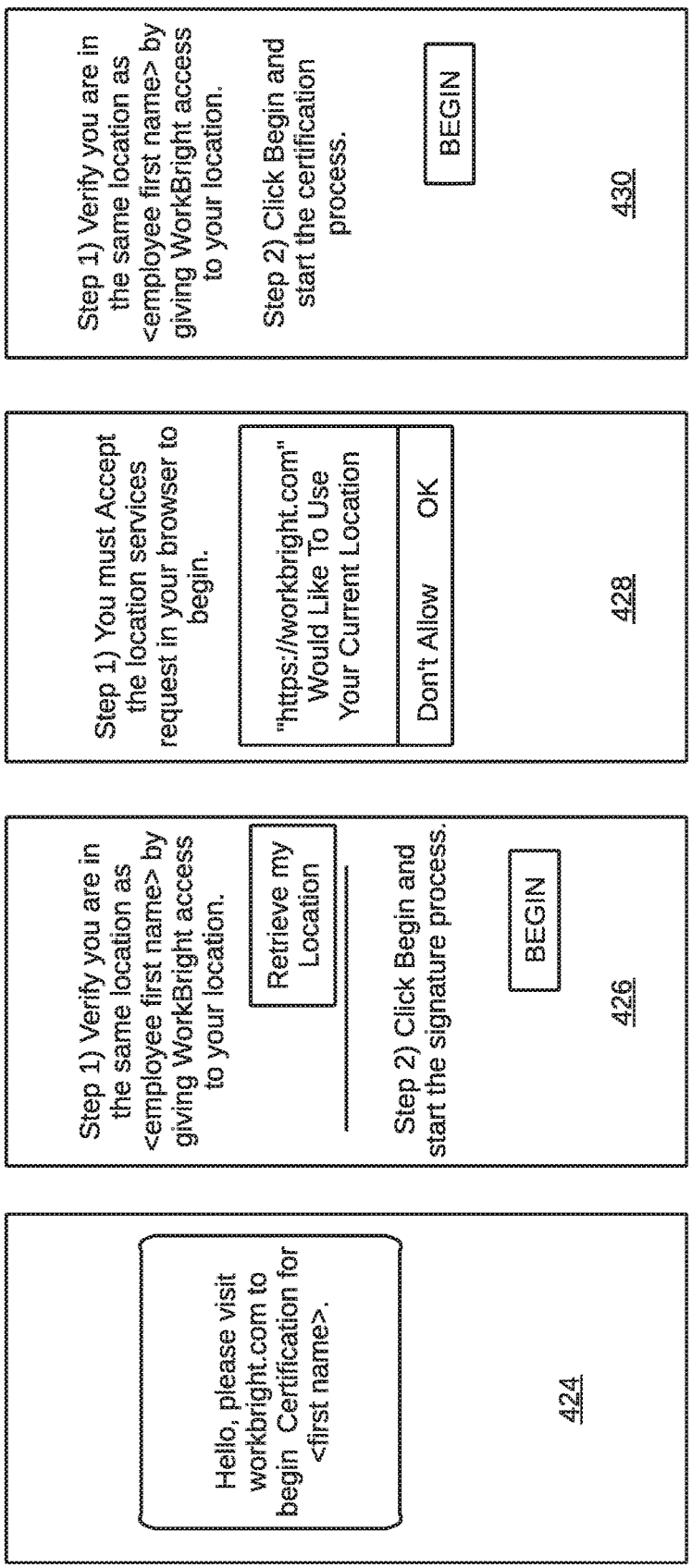

Referring to FIG. 4D, display 424 represents an example of an initial message provided to the authorized representative (second user), indicating that a signer (first user) has requested assistance with a document validation. In display 426, the second user is asked to confirm a common location with the first user/signer. Subsequently, in display 428, a permission request to provide location information is displayed to the second user. Acceptance of the request permits the mobile device associated with the second user to forward location information to the validation platform (not illustrated). The process of sending location information for the second mobile device, and beginning the validation process is continued in display 430). If it is determined, based on the provided location information, that the second mobile device is within a predetermined threshold distance of the first mobile device, then the validation process continues.

Referring to FIG. 4E, display 432 provides the second user with an image of the authentication documents and/or signed documents previously uploaded by the first user. The second user is asked to verify that the displayed authentication documents match the physical copies furnished by the first user. If a match is verified by the second user, then display 434 is provided, which asks the second user to provide their name, and signature, as a witness to the document match. The process is concluded with display 436 in which the second user is able to exit the GUI to finish the document validation process.

FIG. 5 illustrates steps of an example process 500 for implementing a document validation method, according to some aspects of the technology. Process 500 begins with step 502, in which geolocation data for a first mobile device (e.g., mobile device 104) is received by a document validation platform (e.g., validation platform 102). The first mobile device can belong to, or be otherwise associated with a first user (signer) that desires to validate documentation, for example, to complete an employment onboarding process.

In step 504, one or more signed (executed) documents are received, at the validation platform, via the mobile device.

Further to the above example, the signed documents can include various forms required for completion of an employee onboarding process, such as a Form I-9 employment eligibility verification document. As discussed above, the signed documents can be accompanied by (associated with) other documents (e.g., authentication papers) that may include scans of government issued documents (e.g., a driver's license, or ID card), a birth certificate, a social security card, a passport, and/or visa documentation, etc.

In step 506, an electronic contact address for a second mobile device is requested. The second mobile device can be a device that is owned by or otherwise associated with a second user that performs the role of an authorized representative or third-party validator, and that can attest to the physical presence of one or more of the authentication documents. In some implementations, the electronic contact address can be a mobile phone number; however, other address types are contemplated, without departing from the scope of the disclosed technology.

In step 508, an authentication request is transmitted to the second mobile device that is associated with the second user, using the electronic address provided by the first user. The authentication request can include information requesting that the second user perform the functions of an authorized representative, i.e., a witness that is willing to verify the physical presence of one or more of the authentication documents, and/or vouch that the identity of the first user matches the signed electronic documents, etc.

In step 510, geolocation data is received by the validation platform from the second mobile device. The geolocation data for the second mobile device can be compared to the geolocation data for the first mobile device to determine if the two devices are in close proximity to one another. In some aspects, if the first mobile device and the second mobile device are determined to be in the same general location, then it may be inferred that the first user and the second user are physically present, and that the second user can properly act as an authorized representative in the document validation process. Alternatively, if it is determined that the first user device and the second user device are not proximately located, then the validation process may fail, or another means of verifying the common location of the users may be used.

Further to the above examples, where a common location of the first and second mobile devices cannot be verified, common location may be determined using a photograph of the users, or by scanning a barcode or QR code that is displayed on one device (e.g., the first mobile device) using the other device (e.g., the second mobile device).

By providing a means to determine the proximity of the first user and the second user, the document validation platform of the disclosed technology provides solutions to enable remote onboarding to be performed without the need for new employees to travel to an office location to complete employment intake paperwork.

Figure 6:
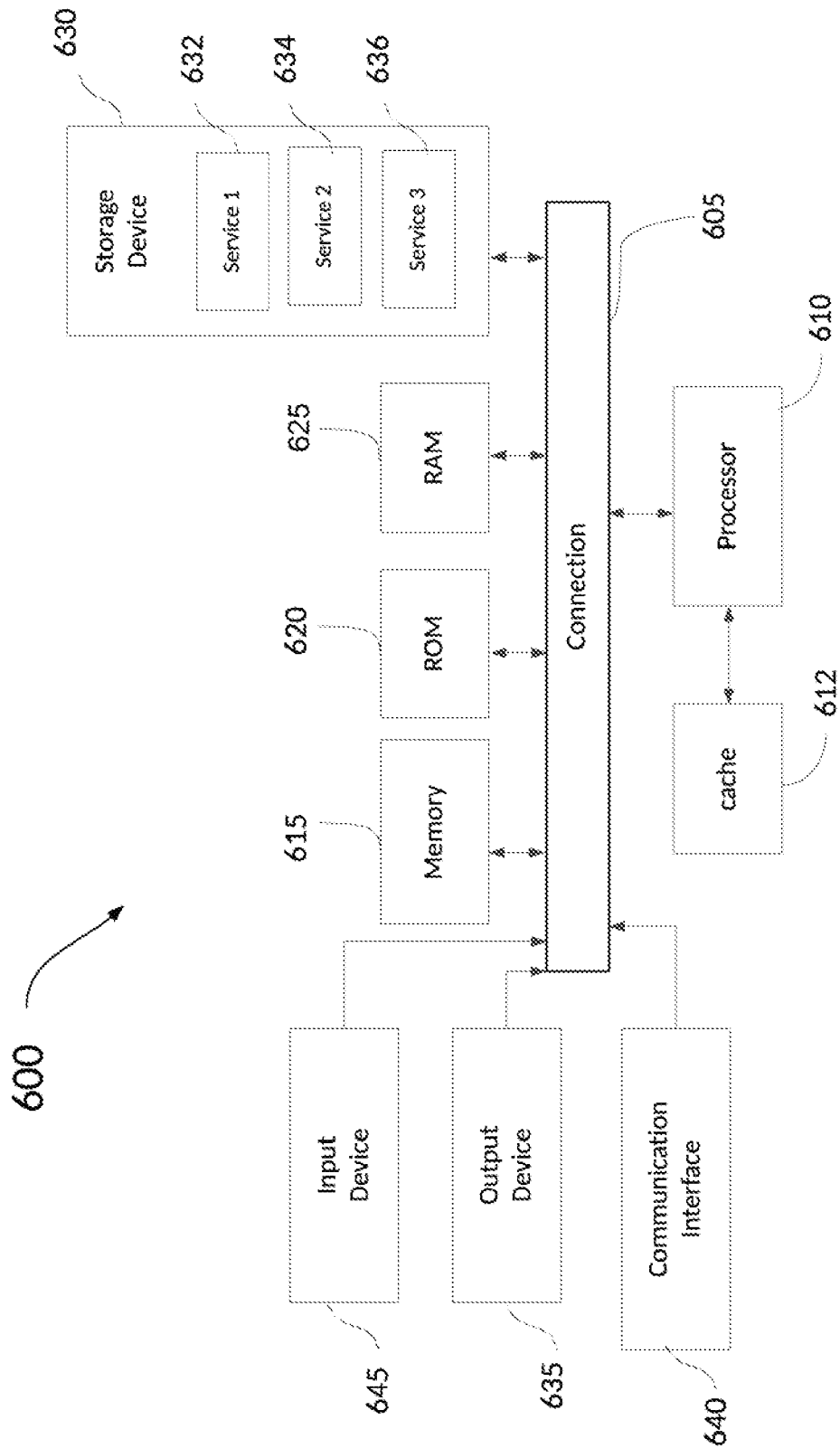
FIG. 6 illustrates an example of an electronic system with which some aspects of the subject technology can be implemented.

FIG. 6 illustrates an example processor-based system with which some aspects of the subject technology can be implemented. For example, processor-based system 600 that can be any computing device that is configured to generate and/or display customized video content for a user and/or which is used to implement all, or portions of, a multimedia editing platform, as described herein. By way of example, system 600 can be a personal computing device, such as a smart phone, a notebook computer, or a tablet computing device, etc. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

By way of example, processor 610 may be configured to execute operations for automatically editing one or more video segments to produce a targeted advertisement. By way of example, processor 610 may be provisioned to execute any of the operations discussed above with respect to process 400, described in relation to FIG. 4. By way of example, processor 610 may be configured to executed operations for aggregating customer data associated with a first customer, retrieving a plurality of customer reviews, wherein each of the customer reviews describe customer satisfaction with a service provided by a corresponding service provider, extracting review metadata for each of the plurality of customer reviews, and matching the first customer with at least one of the plurality of customer reviews based on the customer data and the extracted review metadata for each of the plurality of customer reviews.

In some aspects, matching the first customer with at least one of the plurality of customer reviews may further include operations for identifying at least one service provider associated with the at least one of the plurality of customer reviews.

In some aspects, matching the first customer with at least one of the plurality of customer reviews, may further include operations for providing the customer data and the review metadata to a machine-learning model, receiving, from the machine-learning model, a statistical inference indicating a correlation between the first customer and the at least one of the plurality of customer reviews.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for performing a document validation process, comprising:
receiving geolocation data for a first device associated with a first user;
receiving, from the first device, personal data entered by the first user, an electronic copy of a signed document, and an electronic copy of one or more identity documents associated with the first user;
determining if the signed document was properly executed by the first user based on comparing identity information in the one or more identity documents associated with the first user with the personal data entered by the first user and information provided in the signed document; if the signed electronic document was properly executed, providing a prompt to the first user, wherein the prompt is configured to request electronic contact address for a second device associated with a second user;
receiving geolocation data from the second device associated with the second user;
validating the signed electronic document based on the geolocation data for the first device and the geolocation data for the second device, which comprises determining if the first device is within a predetermined threshold distance of the second device based on network address information associated with the first device and the second device; and
in response to determining that the first device is within the predetermined threshold distance of the second device based on the geolocation data for the first device and the geolocation data for the second device, transmitting an authentication request, the electronic copy of the signed document, and the electronic copy of the one or more identity documents associated with the first user to the second device associated with the second user, the authentication request including a request to verify a physical copy of the one or more identity documents in comparison to the electronic copy of the signed document and the electronic copy of the one or more identity documents associated with the first user.

2. The computer-implemented method of claim 1, wherein the electronic contact address for the second device comprises a phone number.

3. The computer-implemented method of claim 1, wherein the electronic contact address for the second device comprises a screen name or email address.

4. A system comprising:
a memory; and
one or more processors coupled to the memory, the one or more processors being configured to perform operations comprising:
receiving geolocation data for a first device associated with a first user;
receiving, from the first device, personal data entered by the first user, an electronic copy of a signed document, and an electronic copy of one or more identity documents associated with the first user;
determining if the signed document was properly executed by the first user based on comparing identity information in the one or more identity documents associated with the first user with the personal data entered by the first user and information provided in the signed document;
if the signed electronic document was properly executed, providing a prompt to the first user, wherein the prompt is configured to request electronic contact address for a second device associated with a second user;
receiving geolocation data from the second device associated with the second user;
validating the signed electronic document based on the geolocation data for the first device and the geolocation data for the second device, which comprises determining if the first device is within a predetermined threshold distance of the second device based on network address information associated with the first device and the second device; and
in response to determining that the first device is within the predetermined threshold distance of the second device based on the geolocation data for the first device and the geolocation data for the second device, transmitting an authentication request, the electronic copy of the signed document, and the electronic copy of the one or more identity documents associated with the first user to the second device associated with the second user, the authentication request including a request to verify a physical copy of the one or more identity documents associated with the first user in comparison to the electronic copy of the signed document and the electronic copy of the one or more identity documents associated with the first user.

5. The system of claim 4, wherein the electronic contact address for the second device comprises a phone number.

6. The system of claim 4, wherein the electronic contact address for the second device comprises a screen name or email address.

7. A non-transitory computer-readable storage medium comprising instructions stored therein, which when executed by one or more processors, cause the processors to perform operations comprising:
receiving geolocation data for a first device associated with a first user;
receiving, from the first device, personal data entered by the first user, an electronic copy of a signed document, and an electronic copy of one or more identity documents associated with the first user;
determining if the signed document was properly executed by the first user based on comparing identity information in the one or more identity documents associated with the first user with the personal data entered by the first user and information provided in the signed document; if the signed electronic document was properly executed, providing a prompt to the first user, wherein the prompt is configured to request electronic contact address for a second device associated with a second user;
receiving geolocation data from the second device associated with the second user; validating the signed electronic document based on the geolocation data for the first device and the geolocation data for the second device, which comprises determining if the first device is within a predetermined threshold distance of the second device based on network address information associated with the first device and the second device; and in response to determining that the first device is within the predetermined threshold distance of the second device based on the geolocation data for the first device and the geolocation data for the second device, transmitting an authentication request, the electronic copy of the signed document, and the electronic copy of the one or more identity documents associated with the first user to the second device associated with the second user, the authentication request including a request to verify a physical copy of the one or more identity documents associated with the first user in comparison to the electronic copy of the signed document and the electronic copy of the one or more identity documents associated with the first user.

8. The non-transitory computer-readable storage medium of claim 7, wherein the electronic contact address for the second device comprises a phone number.

9. The non-transitory computer-readable storage medium of claim 7, wherein the electronic contact address for the second device comprises a phone number.

* * * * *